United States Patent
Li et al.

(10) Patent No.: US 6,512,660 B1
(45) Date of Patent: Jan. 28, 2003

(54) CURRENT PERPENDICULAR-TO-THE-PLANE MAGNETORESISTANCE READ HEAD WITH LONGITUDINAL OR TRANSVERSE BIAS PROVIDED BY CURRENT

(75) Inventors: Shuxiang Li, Saku (JP); Satoru Araki, Saku (JP)

(73) Assignee: TDK Corporation, Tokyo (JP)

( * ) Notice: Subject to any disclaimer, the term of this patent is extended or adjusted under 35 U.S.C. 154(b) by 4 days.

(21) Appl. No.: 09/686,987

(22) Filed: Oct. 17, 2000

Related U.S. Application Data
(60) Provisional application No. 60/223,315, filed on Aug. 7, 2000.

(51) Int. Cl.[7] .................................................. G11B 5/39
(52) U.S. Cl. ..................................... 360/324; 360/324.1
(58) Field of Search ................................. 360/314, 322, 360/324, 324.1, 324.11, 324.12, 324.2, 327.24, 327.33

(56) References Cited

U.S. PATENT DOCUMENTS

| | | | | |
|---|---|---|---|---|
| 5,216,560 A | * | 6/1993 | Brug et al. .................. 324/252 |
| 5,446,613 A | * | 8/1995 | Rottmayer .................. 360/319 |
| 5,493,467 A | * | 2/1996 | Cain et al. ................... 360/120 |
| 5,627,704 A | | 5/1997 | Lederman et al. ........... 360/321 |
| 5,668,688 A | | 9/1997 | Dykes et al. ............. 360/324.1 |
| 5,784,224 A | * | 7/1998 | Rottmayer et al. ......... 360/324 |
| 6,005,753 A | * | 12/1999 | Fontana et al. .......... 360/324.2 |
| 6,130,810 A | * | 10/2000 | Shibata et al. ............... 360/318 |
| 6,219,212 B1 | * | 4/2001 | Gill et al. ................. 360/324.2 |
| 6,256,178 B1 | * | 7/2001 | Gill .......................... 360/324.2 |

OTHER PUBLICATIONS

Yang et al., "Prediction And Measurement of Perperndicular Giant Magnetorestistances of Co/Cu/Ni$_{84}$ FE$_{16}$/Cu Multilayers", 1995 The American Physical Society, vol. 51, No. 5, pp. 3226–3229, (Feb. 1, 1995–I).

Dauguet et al., "Angular Dependence of the Perpendicular Giant Magnetoresistance of Multilayers", 1996 The American Physical Society, vol. 54, No. 2, pp. 1083–1087 (Jul. 1, 1996–II).

Baibich et al., Physical Review Letters, vol. 61, No. 21, pp. 2472–2475 (1988).

Pratt et al., Physical Review Letters, vol. 66, pp. 3060 (1991).

* cited by examiner

Primary Examiner—David L. Ometz
(74) Attorney, Agent, or Firm—Morgan, Lewis & Bockius LLP

(57) ABSTRACT

A current perpendicular-to-the-plane magnetoresistance (CPP-MR) read head includes a top shield, a bottom shield, and a giant magnetoresistance structure. Top and bottom shields are formed of magnetically shielding, electrically conductive material. The GMR structure is disposed between the top shield and the bottom shield with the GMR structure being in electrical contact with the top and bottom shield such that a sense current flows from one of the top and bottom shields through the GMR structure to the other one of the top and bottom shields. A metal pillar is electrically connected to one of the top and bottom shields. The metal pillar carries the sense current and is disposed such that the current flows in a direction generally perpendicular-to-the-plane of the GMR structure. Depending on the particular application, the read head can be configured so that current flowing in the metal pillar provides either a longitudinal or a transverse bias to the giant magnetoresistance structure.

25 Claims, 7 Drawing Sheets

ID WITH LONGITUDINAL OR
CURRENT PERPENDICULAR-TO-THE-PLANE MAGNETORESISTANCE READ HEAD WITH LONGITUDINAL OR TRANSVERSE BIAS PROVIDED BY CURRENT

The present application also claims the benefit of U.S. Provisional Patent Application No. 60/223,315 filed Aug. 7, 2000, which is hereby incorporated by reference.

BACKGROUND OF INVENTION

1. Field of Invention

The present invention relates to giant magnetoresistance ("GMR") transducers or read heads for reading magnetic signals from magnetic recording media, and more particularly, to current perpendicular-to-the-plane giant magnetoresistance ("CPP-GMR") designs. While the invention finds particular application in conjunction with reading hard disk drives, the invention can be implemented with other magnetic storage media. Moreover, the invention can be implemented in other magnetic field detection devices as well as in other devices and environments.

2. Description of the Related Art

Giant magnetoresistance (GMR) was initially described by Baibich et al. in Physical Review Letters, Volume 61, No. 21, pp. 2472–2475 (1988) which is hereby incorporated by reference. GMR occurs when an application of an external field causes a variation in the relative orientation of the magnetizations of neighboring ferromagnetic layers. This in turn causes a change in the spin-dependent scattering of conduction electrons, thereby changing the electrical resistance of the structure. The discovery of GMR triggered a wide study of transport properties of magnetic multilayers. In most cases, the current flows-in-the plane of the layers, called CIP-MR.

Pratt et al. extended the GMR measurements to the case where the current flows perpendicular-to-the-plane, called CPP-MR as described in Physical Review Letters, Volume 66, pp. 3060 (1991) which is hereby incorporated by reference. In general, the CPP-MR effect is several times larger than the CIP-MR effect. For MR read head applications, the CPP-MR element has to be dramatically scaled down (<100 nm) because of the very small specific resistance of the MR element with the CPP configuration.

U.S. Pat. No. 5,627,704 and U.S. Pat. No. 5,668,688 (which are both hereby incorporated by reference) have described the application of CPP-MR for magnetic transducers. In both cases, a longitudinal magnetic bias means was provided as usual by permanent magnets located at the sides of the GMR structures. With longitudinal magnetic bias, the GMR structure must be a spin valve type structure in order to have good linear response in the field of small signals.

SUMMARY OF THE INVENTION

Accordingly, the present invention is directed to a current perpendicular-to-the-plane magnetoresistance read head that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a current perpendicular-to-the-plane magnetoresistance (CPP-MR) read head includes a top shield formed of magnetically shielding, electrically-conductive material, a bottom shield formed of a magnetically shielding, electrically-conductive material; and a giant magnetoresistance (GMR) structure disposed between the top shield and the bottom shield, the GMR structure being in electrical contact with the top and bottom shield. A first current flows from one of the top and bottom shields through the GMR structure to the other one of the top and bottom shields. A metal pillar is electrically connected to one of the top and bottom shields. The metal pillar carries a second current and is disposed such that the second current flows in a direction generally perpendicular-to-the-plane of the GMR structure.

In another aspect, a current perpendicular-to-the-plane magnetoresistance (CPP-MR) read head includes a pair of magnetic shields defining a read gap; a giant magnetoresistive (GMR) pillar disposed between the pair of magnetic shields in the read gap, the pair of magnetic shields serving as electrical contacts for the GMR pillar; and a nonmagnetic metal pillar electrically connected to one shield of the pair of magnetic shields, the metal pillar disposed parallel to the GMR pillar and separated from the GMR pillar, wherein sense current flows through the GMR pillar according to a perpendicular-to-the-plane model such that the sense current also flows through the metal pillar to provide a magnetic bias.

In another aspect, a method of magnetically biasing a current perpendicular-to-the-plane magnetoresistance (CPP-MR) read head is provided. A current is generated in a GMR structure in a CPP-MR read head. The read head is magnetically biased using the current.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

Co2/Ru0.8/Co2.5/Cu2.5/Co1/NiFe3/Co1/Cu2.5/Co2/ Ru0.8/Co2.5/PtMn10/Ta3 (stated thickness in nm) having no longitudinal bias, longitudinal optimal bias where D=200 nm, and longitudinal over bias where D=100 nm.

DETAILED DESCRIPTION OF THE PREFERRED EMBODIMENTS

Reference will now be made in detail to the preferred embodiments of the present invention, examples of which are illustrated in the accompanying drawings.

The present invention discloses both longitudinal and transverse magnetic bias means for the application of different types of GMR structures. The present invention includes a CPP GMR read head having a pair of shields, which also act as electrical leads to carry a sense current flowing perpendicular-to-the-plane of the device. A sense current provides either a longitudinal magnetic bias or a transverse magnetic bias to the GMR element in accordance with the requirements of the particular GMR structure.

To optimize the operating point and to reduce Barkhausen noise of a particular GMR structure, a longitudinal magnetic bias is provided to a SV type, and hybrid or dual SV type GMR structures. Analogously, a transverse magnetic bias is provided to a GMR multilayer structure of [ferromagnetic/nonmagnetic]$_n$.

Figure 1:
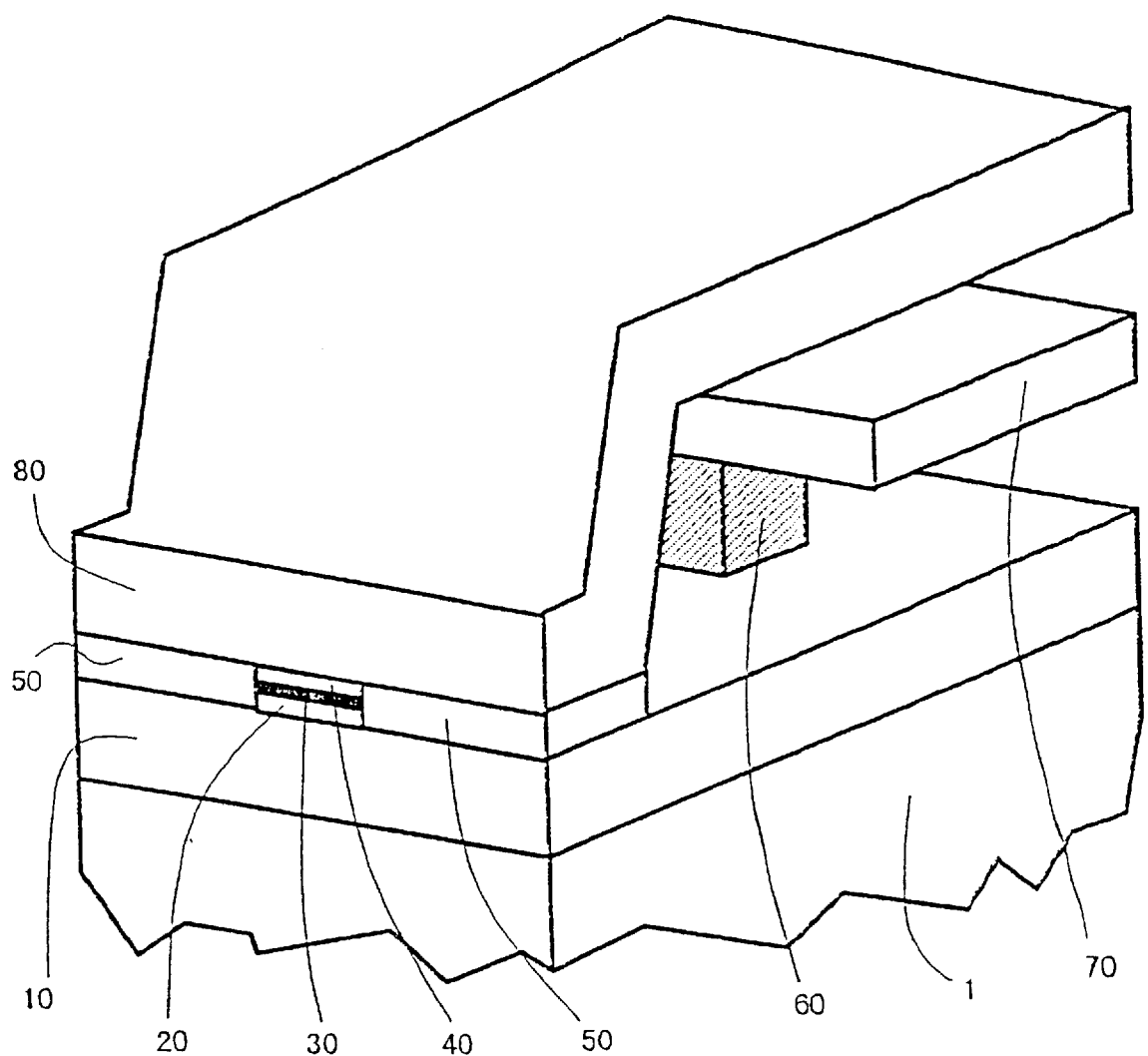
FIG. 1 is an isometric view of one embodiment of CPP-MR head of present invention.

FIG. 1 shows an isometric view of an embodiment of a CPP head configuration of the present invention. The CPP-MR pillar 30 is placed in between two shields (bottom shield 10 and top shield 80), which are separated from each other by oxide 50 made of Al$_2$O$_3$ or SiO$_2$. Two nonmagnetic metal gaps 20 and 40 electrically connect the CPP-MR pillar 30 with the shields 10 and 80. Thus, the two shields 10 and 80 also act as contact leads for the CPP-MR pillar 30. A nonmagnetic metal pillar 60 is located behind the CPP-MR pillar 30 and electrically contacts with bottom shield 10 and an electrical lead 70. The shields may be made of CoZrNb, CoZrTa or NiFe alloys. The GMR pillar 30 comprises a SV type structure of [F1/NM/F2/NM]$_n$, where F1 and F2 are ferromagnetic layers with a large difference of coercivities, NM is nonmagnetic layer made of noble metals. Preferably, the CPP-MR pillar 30 has a thickness between 10 nm and 100 nm.

It is to be appreciated that the GMR structure may include other types of SV structures such as those described in U.S. Pat. No. 5,668,688. For example, the GMR structure may 102 include a SV structure in which the pinned layer is made of a single ferromagnetic layer. Alternatively, the GMR structure may include a synthetic pinned SV, where the pinned layer is a laminated synthetic pinned layer of F/Ru/F, where F is a ferromagnetic layer. In an alternative embodiment, the GMR pillar is a dual SV structure having two conventional SVs where the pinned layers are made of a single ferromagnetic layer. In another alternative embodiment, the GMR pillar is a dual SV structure having laminated synthetic pinned layers of F/Ru/F, where F is a ferromagnetic layer.

Figure 2A:
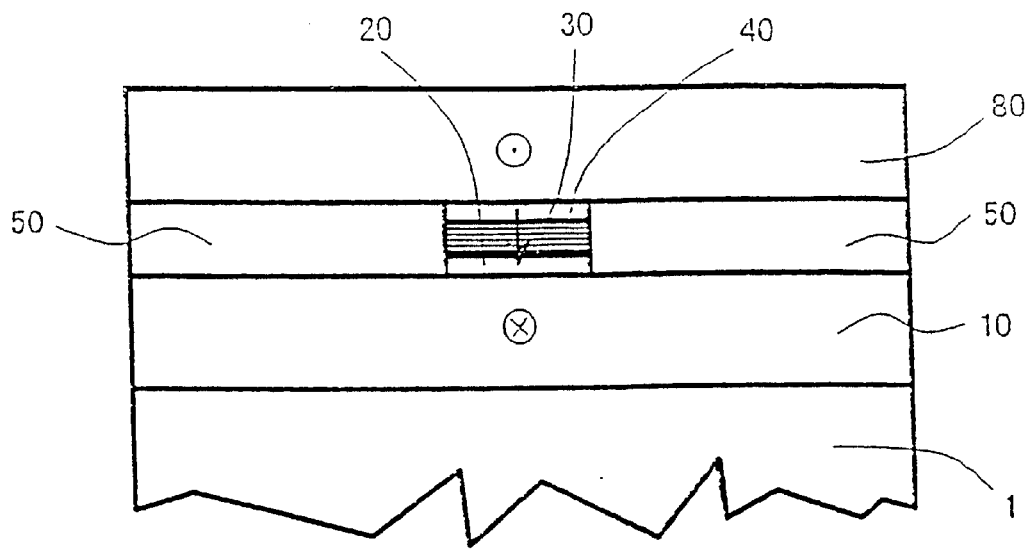
FIG. 2a is a schematic cross-sectional view of the air bearing surface (ABS) of the one embodiment.

FIG. 2a is a cross-sectional view of ABS of the embodiment described in FIG. 1. The sense current, being carried by top shield 80 and bottom shield 10, passes through the CPP-MR pillar 30 in a CPP model, as represented by the arrow.

Figure 2B:
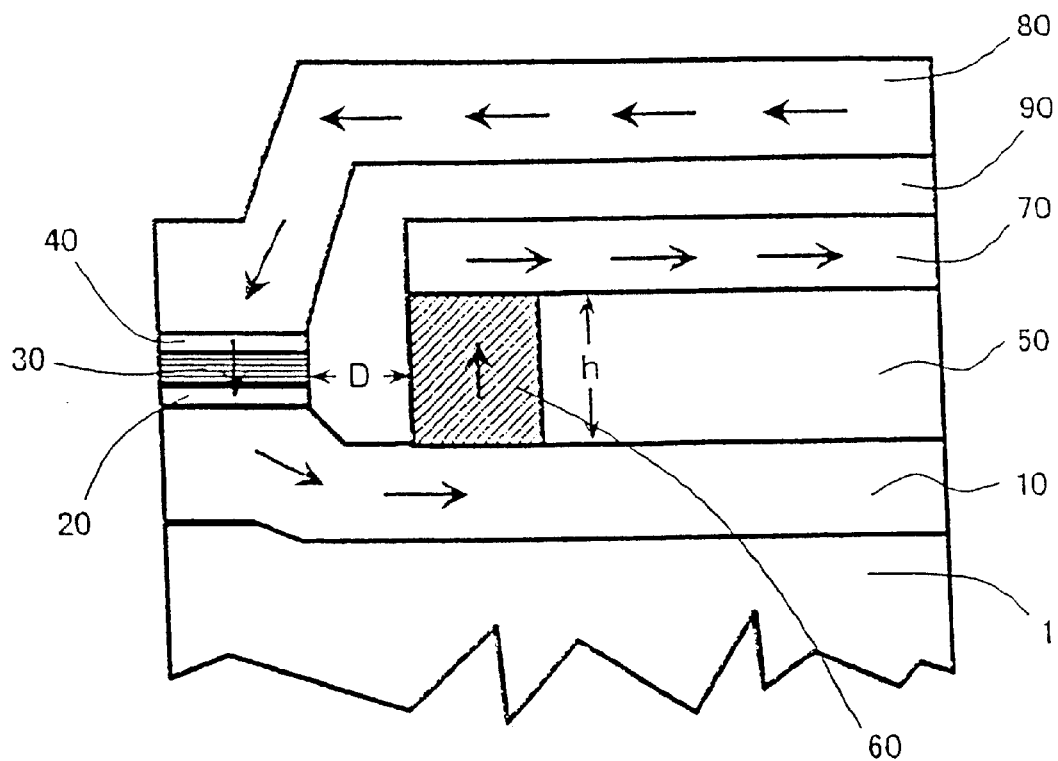
FIG. 2b is a schematic cross-sectional side view of the ABS of the embodiment.

FIG. 2b is a cross-sectional side view of ABS of the embodiment described in FIG. 1. A nonmagnetic metal pillar 60 is set behind and electrically isolated to the CPP-MR pillar 30 and the metal gaps 20 and 40 by oxide 90 made of Al$_2$O$_3$ or SiO$_2$, for example. Meanwhile, the metal pillar 60 electrically contacts with both bottom shield 10 and a lead 70, thus the sense current, passing through the CPP-MR pillar 30, also flows in the metal pillar in a direction parallel to the CPP-MR pillar 30, as represented by the arrows. In other words, the current in the metal pillar flows in a direction perpendicular-to-the-plane of the MR pillar. The current flowing in the metal pillar 60 provides a longitudinal magnetic bias field to the GMR structure. Varying the space D between the CPP-MR pillar 30 and the metal pillar 60 or the sense current density or the height h of the metal pillar 60 can optimize the operation point of the CPP-MR element. Preferably, the CPP-MR pillar is positioned symmetrically with respect to the metal pillar such that the generated magnetic field is as perpendicular or longitudinal as possible with respect to the center of CPP-MR pillar. In other words, the CPP-MR pillar is positioned symmetrically with respect to the metal pillar such that a height center of the metal pillar and a height center of the MR pillar are in a plane orthogonal to the current flowing in the MR pillar.

Figure 3:
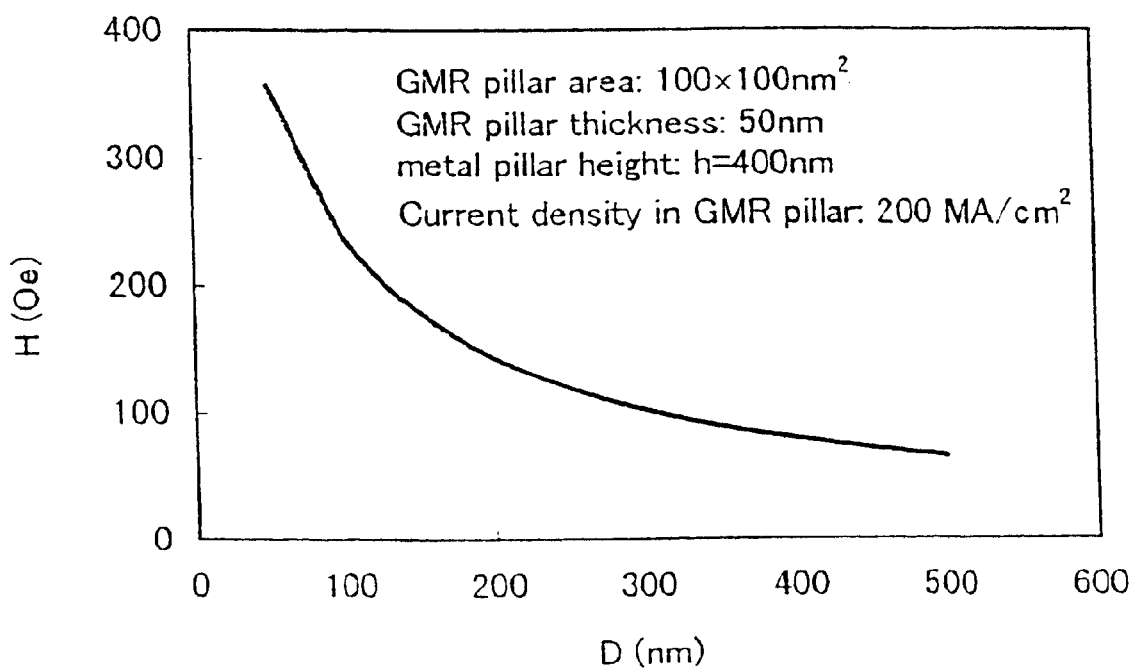
FIG. 3 is a graph of the amplitude of the magnetic bias field versus the distance between the metal pillar and the GMR pillar.

FIG. 3 plots the amplitude of the magnetic bias field versus the space D with the area of the CPP-MR pillar 30 being 100×100 nm$^2$.

Figure 4A:
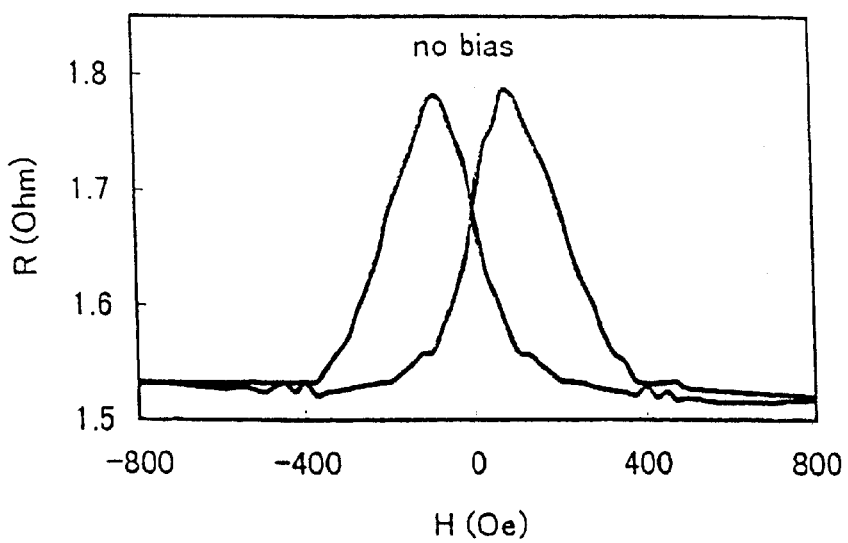
FIGS. 4a–c are three graphs of CPP resistance versus applied magnetic field for an unshielded sensor with a structure of [NiFe2/Cu2.5/CoFe2/Cu2.5]$_5$ (stated thickness in nm) having no longitudinal bias, longitudinal under bias where D=200 nm, and longitudinal optimal bias where D=100 nm.
Figure 4B:
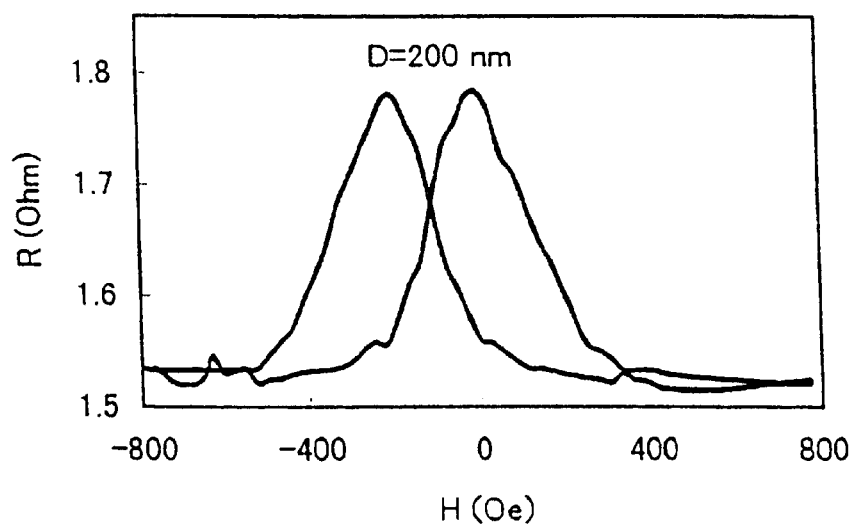
Figure 4C:
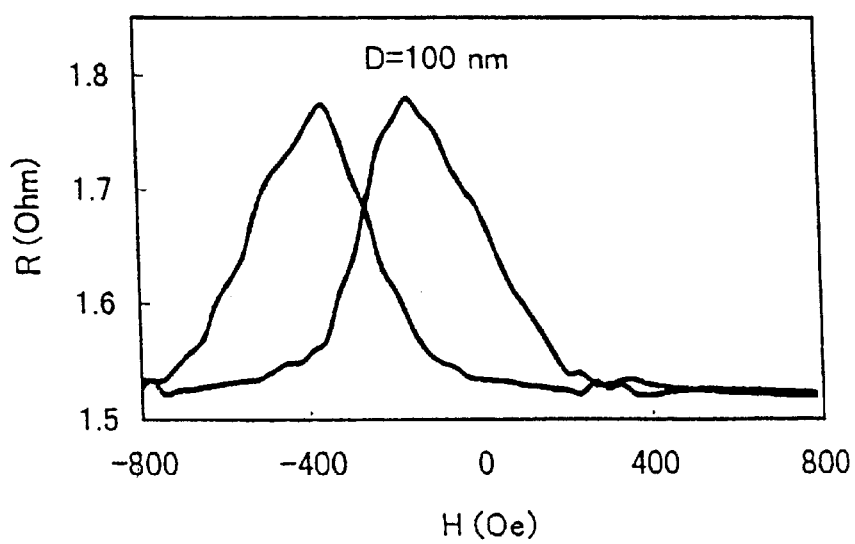

FIGS. 4a–4c illustrate the CPP resistance versus magnetic field for an unshielded sensor with a hybrid, SV-type, multi-layer structure of [NiFe2/Cu2.5/CoFe2/Cu2.5]$_5$. (Here, the numbers following each layer composition represent the thickness in nm.) The soft layer is an alloy of 81% NiFe-19% Fe. The hard layer is 95% Co-5% Fe, which results in a smaller saturation field than pure Co. The sensor has a dimension of 100×100 nm$^2$. The height of the metal pillar 60 (FIG. 1) is about 400 nm. The current density during measurement is about 200 MA/cm$^2$. Without longitudinal magnetic bias, the GMR element shows a typical butterfly R-H curve. When a metal pillar 60 is disposed behind the CPP-MR pillar as described above, the GMR element is subject to a longitudinal magnetic bias, thus a shift of R-H curve is observed. With continuing reference to FIG. 4b, for a GMR element with size of 100×100 nm$^2$ where D=200 nm, the R-H curve is shifted but the GMR element still remains under biased. With reference to FIG. 4c, where D=100 nm, the R-H curve is further shifted and the GMR element is more optimally biased. Thus, in order to optimize the operation point, the distance between the GMR element and the metal pillar is required to be about 100 to 200 nm.

Figure 5:
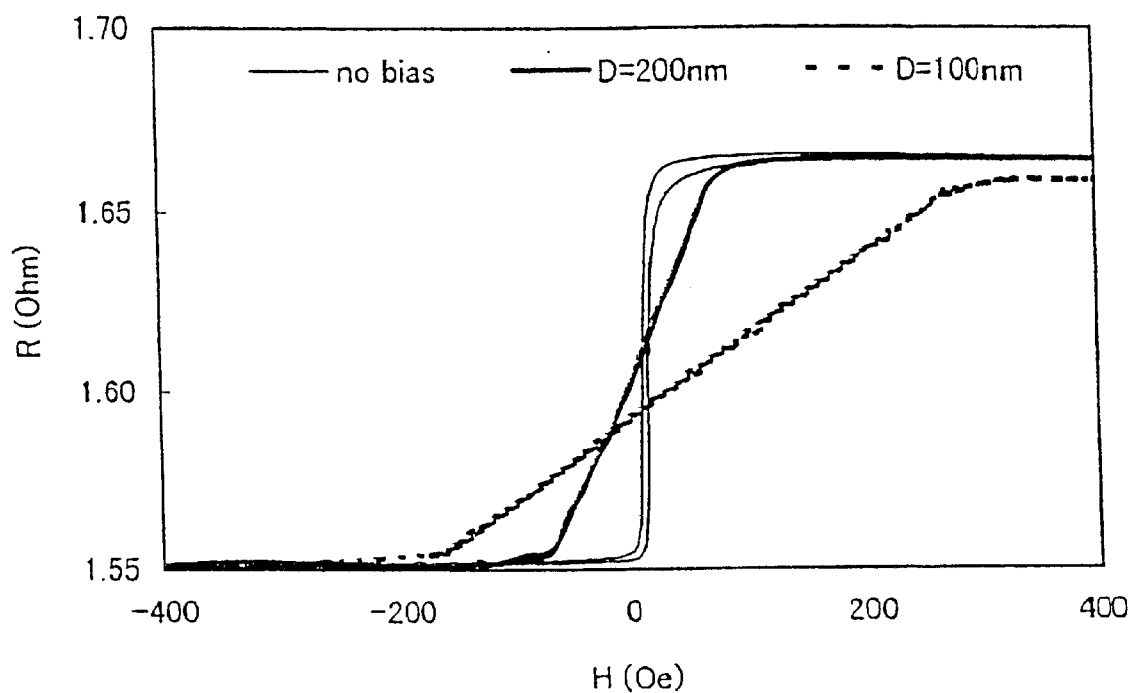
FIG. 5 is a graph showing three curves of CPP resistance versus applied magnetic field for an unshielded sensor with a single-free layer spin valve (SV) structure of Ta3/PtMn10/

FIG. 5 depicts the magnetotransport results for an unshielded sensor with a single-free layer SV structure of Ta3/PtMn10/Co2/Ru0.8/Co2.5/Cu2.5/Co1/NiFe3/Co1/ Cu2.5/Co2/Ru0.8/Co2.5/PtMn10/Ta3 (again, the numbers following each layer composition represent the thickness in nm). The sensor has a dimension of 100×100 nm$^2$. The current density during measurement is about 200 MA/cm$^2$. The height of the metal pillar 60 (FIG. 1) is about 400 nm. Due to the utilization of synthetic pinned layer Co/Ru/Co, the effective exchange fields acting on the synthetic pinned layers from the two PtMn layers are over 1500 Oe (not shown in FIG. 5). In the small field range and without longitudinal magnetic bias, a R-H curve similar to a typical spin valve R-H curve with CIP geometry is observed. When a metal pillar 60 is disposed behind the CPP-MR pillar 30 (FIG. 1) as described above, the GMR element is subject to a longitudinal magnetic bias. Thus, the R-H curve shows a larger linearity range and the sensitivity is related to the distance between the GMR element and the metal pillar, as shown in FIG. 5. With continuing reference to FIG. 5, for a GMR element with size of 100×100 nm² where D=100 nm, the GMR element is overbiased. Where D=200 nm, the GMR element is more optimally biased.

Figure 6:
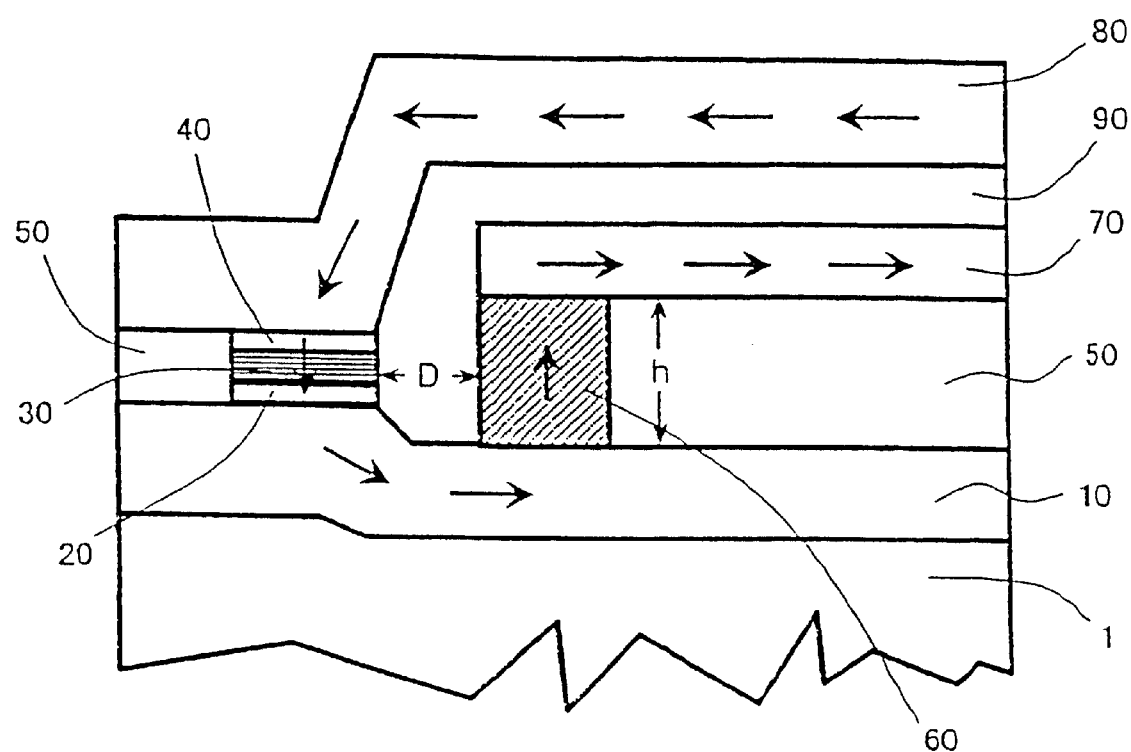
FIG. 6 is schematic view of the ABS of another embodiment of present invention.

FIG. 6 is the air bearing surface of another embodiment of present invention. The CPP-MR pillar 30 is placed in between two shields (bottom shield 10 and top shield 80), which are separated from each other by oxide 50 made of $Al_2O_3$ or $SiO_2$. Two nonmagnetic metal gaps 20 and 40 electrically connect the CPP-MR pillar 30 with the shields 10 and 80, thus the two shields 10 and 80 also act as contact leads for the CPP-MR pillar 30. A nonmagnetic metal pillar 60 is located to one side of the CPP-MR pillar 30 and electrically contacts with bottom shield 10 and an electrical lead 70. Thus, the sense current, passing through the CPP-MR pillar 30, also flows in the metal pillar 60 in a direction parallel to the GMR pillar, as represented by the arrows. In other words, the current flowing in the metal pillar flows in a direction generally perpendicular-to-the-plane of the MR pillar. The current flowing in the metal pillar 60 provides a transverse magnetic bias field to the GMR structure. The magnetic bias would be orthogonal to and directed out of the page towards the reader. The GMR pillar 30 comprises a multilayer structure of $[F/NM]_n$, where F is made of ferromagnetic materials and NM is made of non-magnetic materials, such as noble metals. At zero magnetic field, the neighboring F layers are antiferromagnetically coupled. Preferably, the CPP-MR pillar is positioned symmetrically with respect to the metal pillar such that a height center of the metal pillar and a height center of the MR pillar are in a plane orthogonal to the current flowing in the MR pillar.

Figure 7:
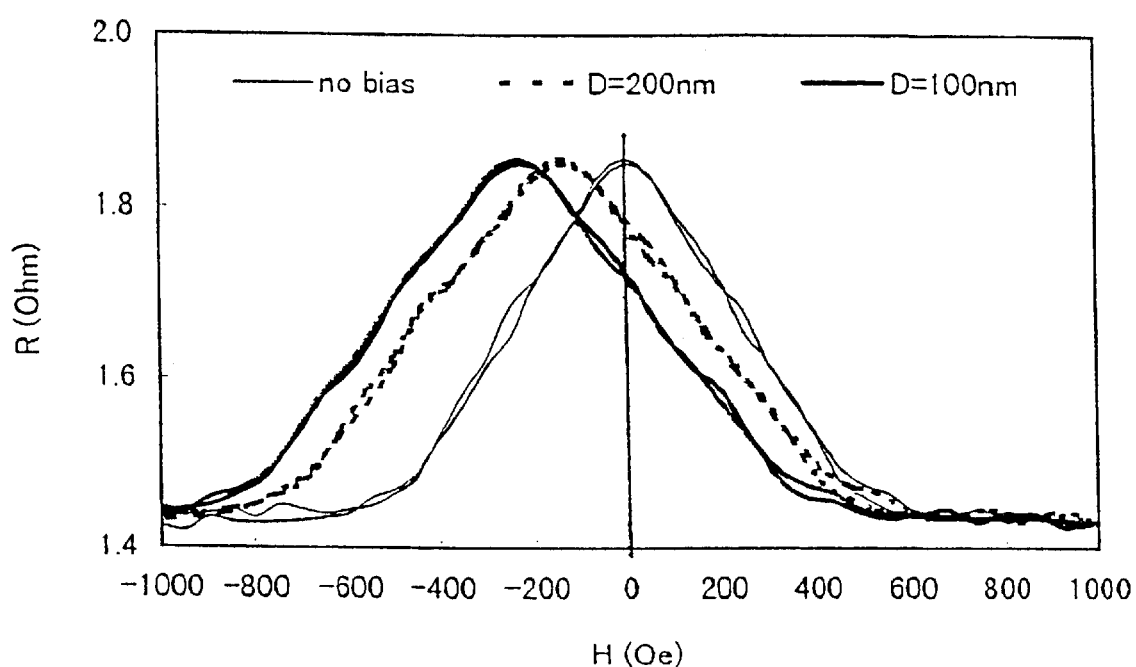
FIG. 7 is a graph showing three curves of CPP resistance versus applied magnetic field for an unshielded sensor with a multilayer structure of [CoFe2.5/Cu2]$_{10}$ (stated thickness in nm) having no bias, under bias where D=200 nm, and more optimal bias where D=100 nm.

FIG. 7 plots the CPP resistance versus applied magnetic field for an unshielded sensor with a multi-layer (not SV type) structure of $[CoFe2.5/Cu2]_{10}$. (The numbers following each layer composition represent the thickness in nm). The GMR sensor has a dimension of 100×100 nm². The current density during measurement is about 200 MA/cm². The height of the metal pillar is about 400 nm. Without transverse magnetic bias, the R-H curve is centered at zero magnetic field. The resistance is maximum at zero field due to the strong antiferromagnetic coupling between the neighboring CoFe layers. When a metal pillar is disposed at the side of the CPP-MR pillar as described above, the GMR element is subject to a transverse magnetic bias. Thus, a shift of the R-H curve is observed and a linear response in small signal field range is obtained. As shown, where D=200 nm, the GMR element is under biased. Where D=100 nm, the GMR element is more optimally biased.

Although FIG. 5, FIG. 6 and FIG. 7 are results for unshielded sensors, the same magnetic bias effect is expected for CPP-MR heads with shielded sensors. Accordingly, similar results are expected for CPP-MR heads in a variety of applications and environments.

It will be apparent to those skilled in the art that various modifications and variations can be made in the current perpendicular-to-the-plane magnetoresistance read head of the present invention without departing from the spirit or scope of the invention. Thus, it is intended that the present invention cover the modifications and variations of this invention provided they come within the scope of the appended claims and their equivalents.

What is claimed is:

1. A current perpendicular-to-the-plane magnetoresistance (CPP-MR) read head, comprising:
   a top shield formed of magnetically shielding, electrically-conductive material;
   a bottom shield formed of a magnetically shielding, electrically-conductive material;
   a giant magnetoresistance (GMR) structure disposed between the top shield and the bottom shield, the GMR structure being in electrical contact with the top and bottom shields such that a first current flows from one of the top and bottom shields through the GMR structure to the other one of the top and bottom shields;
   a metal pillar separately formed from the GMR structure and electrically connected to one of the top and bottom shields, the metal pillar carrying a second current, the metal pillar disposed such that the second current flows in a direction generally perpendicular-to-the-plane of the GMR structure.

2. The CPP-MR read head according to claim 1, wherein the first current is a sense current, and the first current equals the second current.

3. The CPP-MR read head according to claim 1, wherein the second current magnetically biases the GMR structure.

4. The CPP-MR read head according to claim 1, wherein the second current magnetically biases the GMR structure, the magnetic bias being one of a longitudinal bias and a transverse bias.

5. The CPP-MR read head according to claim 1, wherein the metal pillar is disposed a distance from the GMR structure, an amount of magnetic bias being determined at least in part by the distance.

6. The CPP-MR read head according to claim 1, wherein the metal pillar is disposed to one side of the GMR structure to provide a transverse magnetic bias to the structure.

7. The CPP-MR read head according to claim 1, wherein the metal pillar is disposed behind the GMR structure to provide a longitudinal magnetic bias to the structure.

8. The CPP-MR read head according to claim 1, wherein the GMR structure comprises a spin valve structure.

9. The CPP-MR read head according to claim 1, wherein the GMR structure includes one or more of: a dual spin valve structure; a hybrid spin valve structure of the form $[F1/NM/F2/NM]_n$, where F1 and F2 are ferromagnetic layers with large difference of coercivities, and NM is a non-magnetic layer; and a multilayer $[F/NM]_n$ structure, where F represents a ferromagnetic layer and NM represents a non-magnetic layer, adjacent ferromagnetic layers being antiferromagnetically coupled when the magnetic field is zero.

10. The CPP-MR read head according to claim 1, further comprising a first nonmagnetic metal gap to electrically interconnect the top shield with the GMR structure and a second nonmagnetic metal gap to electrically interconnect the bottom shield with the GMR structure.

11. The CPP-MR read head according to claim 1, wherein the GMR structure has a thickness between 10 nm and 100 nm.

12. The CPP-MR read head according to claim 1, wherein a height of the GMR structure is less than 100 nm.

13. The CPP-MR read head according to claim 1, wherein the first current has a density between 100 and 1000 MA/cm².

14. The CPP-MR read head according to claim 1, wherein a height of the metal pillar is between 200 nm and 800 nm.

15. The CPP-MR read head according to claim 1, further comprising an oxide for electrically isolating the metal pillar from the GMR element by a distance between 50 nm and 300 nm.

16. The CPP-MR read head according to claim 1, wherein the metal pillar is aligned symmetrically with respect to the GMR pillar.

17. The CPP-MR read head according to claim 1, further comprising a conductive lead, wherein one end of the metal pillar is connected to one of the top and bottom shields, and the other end of the metal pillar is connected to the conductive lead.

18. A current perpendicular-to-the-plane magnetoresistance (CPP-MR) read head, comprising:
   a pair of magnetic shields defining a read gap;
   a giant magnetoresistive (GMR) pillar disposed between the pair of magnetic shields in the read gap, the pair of magnetic shields serving as electrical contacts for the GMR pillar; and
   a nonmagnetic metal pillar electrically connected to one shield of the pair of magnetic shields, the metal pillar disposed parallel to the GMR pillar and separated from the GMR pillar,
   wherein sense current flows through the GMR pillar according to a perpendicular-to-the-plane model such that the sense current also flows through the metal pillar to provide a magnetic bias.

19. The CPP-MR read head according to claim 18, further comprising a pair of nonmagnetic metal gaps interconnecting the pair of shields to the GMR pillar.

20. The CPP-MR read head according to claim 18, wherein an amount of bias is determined by a distance between the GMR pillar and the metal pillar.

21. The CPP-MR read head according to claim 18, wherein one of a longitudinal magnetic bias and a transverse bias is provided.

22. A method of magnetically biasing a current perpendicular-to-the-plane magnetoresistance (CPP-MR) read head, comprising:
   generating a sense current in a GMR structure in a CPP-MR read head;
   generating a magnetic bias field using the sense current;
   magnetically biasing the read head by the magnetic bias field generated,
   wherein the step of magnetically biasing includes a step of passing the current through a metal pillar; and
   electrically isolating the metal pillar from the GXM structure using an oxide.

23. The method according to claim 22, wherein the step of magnetically biasing includes a step of biasing the GMR structure in one of a longitudinal direction and a transverse direction.

24. The method according to claim 21, further comprising:
   defining an amount of bias to the GMR structure according to a distance between the GMR structure and the metal pillar.

25. A method of magnetically biasing a current perpendicular-to-the-plane magnetoresistance (CPP-MR) read head, comprising;
   generating a sense current in a GMR structure in a CPP-MR read head, the GMR structure being disposed between a top shield and a bottom shield;
   passing the sense current through a metal pillar, the metal pillar being separately formed from the GMR structure, electrically connected to one of the top and bottom shields, and disposed such that the sense current flows in a direction generally perpendicular-to-the-plane of the GMR structure;
   generating a magnetic bias field using the sense current which flows in the metal pillar; and
   magnetically biasing the read head by the magnetic bias field generated.

* * * * *